US008345392B2

(12) United States Patent
Blakes

(10) Patent No.: US 8,345,392 B2
(45) Date of Patent: Jan. 1, 2013

(54) QUENCH ENERGY DISSIPATION FOR SUPERCONDUCTING MAGNETS

(75) Inventor: Hugh Alexander Blakes, Oxfordshire (GB)

(73) Assignee: Siemens Plc, Frimley, Camberly (GB)

( * ) Notice: Subject to any disclaimer, the term of this patent is extended or adjusted under 35 U.S.C. 154(b) by 225 days.

(21) Appl. No.: 12/823,661

(22) Filed: Jun. 25, 2010

(65) Prior Publication Data

US 2011/0056218 A1 Mar. 10, 2011

(30) Foreign Application Priority Data

Jun. 26, 2009 (GB) .................................. 0911064.4

(51) Int. Cl.
*H02H 7/00* (2006.01)
*H02H 9/00* (2006.01)
*H01H 47/26* (2006.01)

(52) U.S. Cl. .......... 361/19; 361/93.9; 361/141; 335/216

(58) Field of Classification Search .................... 361/19, 361/93.9, 141; 335/216
See application file for complete search history.

(56) References Cited

U.S. PATENT DOCUMENTS 3,577,067 A * 5/1971 Weaver, Jr. .................... 324/320
4,689,707 A * 8/1987 Schwall .......................... 361/19
4,763,221 A * 8/1988 Takechi ........................ 361/141
4,841,268 A * 6/1989 Burnett et al. ................ 335/216
4,906,861 A * 3/1990 Roy et al. ....................... 307/138
5,016,600 A * 5/1991 Hilal ................................ 124/3
5,361,055 A * 11/1994 Peck ............................. 335/216
5,598,710 A * 2/1997 Tomeoku et al. .............. 62/51.1
5,627,709 A * 5/1997 Salasoo ........................... 361/19
5,731,939 A * 3/1998 Gross et al. ...................... 361/19
6,646,836 B2 * 11/2003 Yoshikawa ...................... 361/19
7,068,133 B2 * 6/2006 Ries .............................. 335/216
7,990,661 B2 * 8/2011 Higuchi et al. ................. 361/19
2006/0279387 A1 12/2006 Nemoto et al.

FOREIGN PATENT DOCUMENTS

EP 0 145 940 A1 11/1984
GB 1 327 500 8/1973
JP 54-132194 (A) 10/1979

OTHER PUBLICATIONS

British Search Report, dated Sep. 23, 2009 (2 pages).

* cited by examiner

*Primary Examiner* — Rexford Barnie
*Assistant Examiner* — Zeev V Kitov
(74) *Attorney, Agent, or Firm* — Crowell & Moring LLP

(57) ABSTRACT

An energy dissipation arrangement for a cryogenically cooled superconductive magnet comprising a plurality of superconductive coils (10) connected in series and housed within a cryostat (24), comprising a superconducting switch (25) having a superconductive current path (28) in series with the superconductive coils (10); and a resistor (38), external to the cryostat, electrically connected in parallel with the superconductive current path (28) of the superconducting switch (25). The superconductive switch is arranged (26, 32, 30) to open in response to an electric current applied to an associated heater (26; 40).

4 Claims, 2 Drawing Sheets

QUENCH ENERGY DISSIPATION FOR SUPERCONDUCTING MAGNETS

The present invention relates to cryogenically cooled superconducting magnets. More particularly, it relates to arrangements for dissipating energy released by such magnets during a quench.

As is well known in the art, a superconducting magnet is typically made up of a number of coils of superconducting wire, cooled to a cryogenic temperature, typically about 4K, at which superconductivity is possible. When cold, an electric current is introduced into the superconducting coils. The current circulates in the coils, even when disconnected from an external power supply, providing a magnetic field in so-called "persistent mode".

For any of several reasons, one part of a magnet coil may cease to be superconducting. For example, a defect in the superconducting wire, a sudden movement of part of the wire, a mechanical impact, or action of an external heat source may cause a part of a magnet coil to cease to be superconducting, and revert to its "normal", resistive mode. The current continues to circulate through the coil, and ohmic heating at the resistive part causes adjacent parts of the coil to become resistive. The result is that the whole coil becomes resistive, and heats up. Usually, arrangements are made to spread a quench over all coils within a magnet, so that no single coil needs to dissipate all of the energy stored in the magnetic field, which might otherwise damage the coil by overheating.

Figure 1:
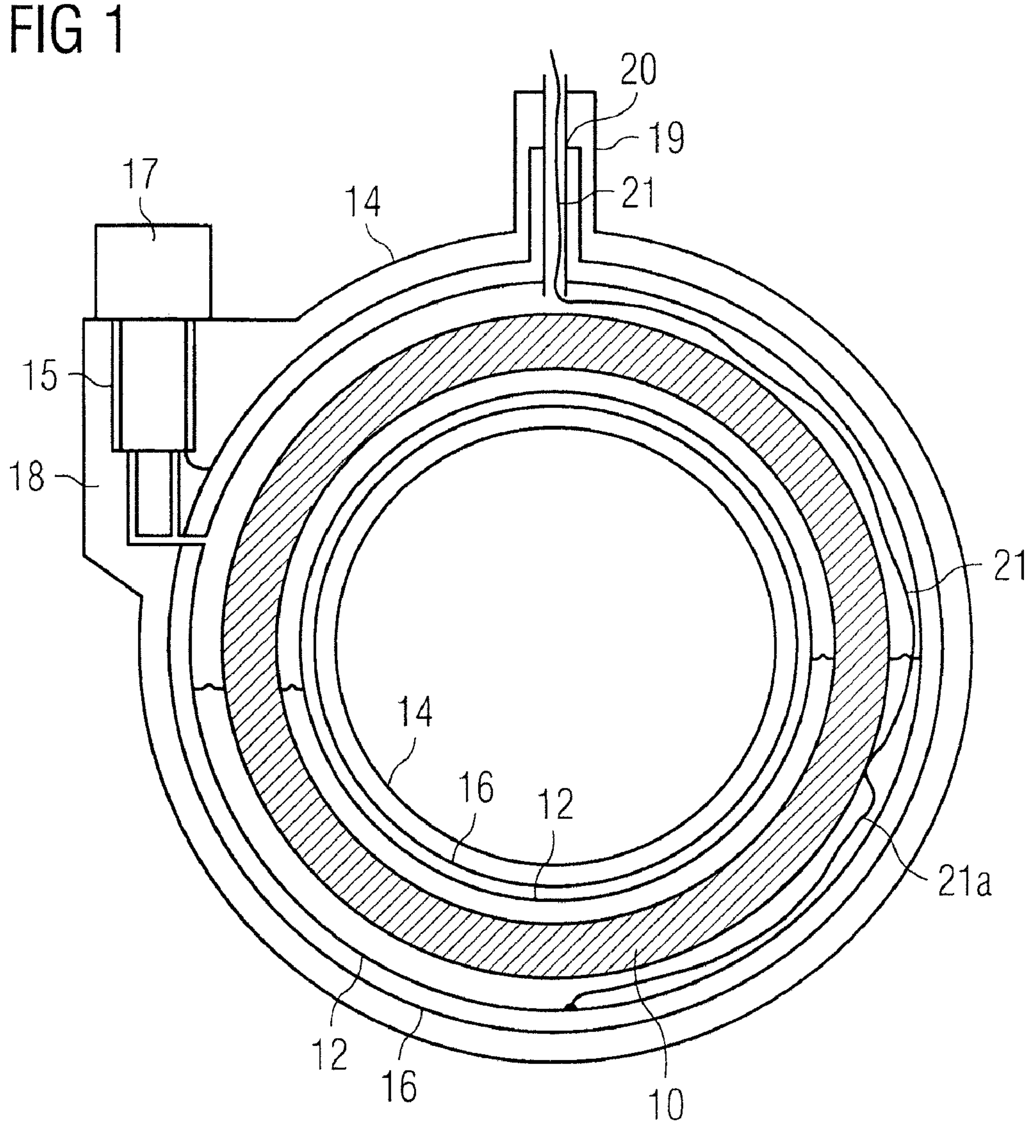

FIG. 1 shows a conventional arrangement of a cryostat including a cryogen vessel 12 partially filled with a liquid cryogen. A cooled superconducting magnet 10, made up of a number of coils of superconducting wire, is provided within cryogen vessel 12, itself retained within an outer vacuum chamber (OVC) 14. The superconducting wire is itself typically made up of a number of thin filaments of superconducting wire within a protective copper matrix. The copper provides mechanical protection, and a parallel current path which carries current when the superconducting wire filaments are in their 'normal', resistive, mode. One or more thermal radiation shields 16 are provided in the vacuum space between the cryogen vessel 12 and the outer vacuum chamber 14. In some known arrangements, a refrigerator 17 is mounted in a refrigerator sock 15 located in a turret 18 provided for the purpose, towards the side of the cryostat. Alternatively, a refrigerator 17 may be located within access turret 19, which retains access neck (vent tube) 20 mounted at the top of the cryostat. The refrigerator 17 provides active refrigeration to cool cryogen gas within the cryogen vessel 12, in some arrangements by recondensing it into a liquid. The refrigerator 17 may also serve to cool the radiation shield 16. As illustrated in FIG. 1, the refrigerator 17 may be a two-stage refrigerator. A first cooling stage is thermally linked to the radiation shield 16, and provides cooling to a first temperature, typically in the region of 80-100K. A second cooling stage provides cooling of the cryogen gas to a much lower temperature, typically in the region of 4-10K.

A negative electrical connection 21*a* is usually provided to the magnet 10 through the body of the cryostat. A positive electrical connection 21 is usually provided by a conductor passing through the vent tube 20.

When a superconducting magnet coil quenches, the energy stored in the magnetic field is turned to heat as the superconducting filaments become resistive, and current diverts from the resistive superconducting filaments into the less-resistive copper matrix.

Typically, arrangements are made to deliberately quench all coils that share the same cryostat when one of them spontaneously quenches. This is called 'quench propagation' and ensures that when one coil quenches, the whole magnet quenches, thus spreading the magnet energy as evenly as possible between the coils, and reducing the likelihood that any one coil should be damaged by overheating. Quench propagation is usually achieved by connecting coil heaters to tapping points between certain coils of the magnet. When a resistive or inductive voltage is generated by a quenching coil, this voltage causes dissipation in the heaters, which are bonded to the coils of the magnet, thus causing all coils to quench. It is inherent in this arrangement that all the stored energy of the magnet will be dissipated as heat into the mass of the wire and a former on which the wire is wound, thus remaining inside the cryostat.

This heat rapidly boils the liquid cryogen and expels it from the cryostat. Most of the heat generated during the quench is absorbed by the copper wire and the coil former, and so remains inside the cryostat, despite the expulsion of cryogen. This heat must then be removed from the cryostat before the magnet can be returned to its superconducting state.

Conventionally, this is typically accomplished by either refilling with liquid cryogen and removing the heat via evaporation and exhaust of the boiled-off cryogen gas, or by flushing with cold cryogen gas. Both these processes are time-consuming and expensive in cryogen use.

Rather than address the issue of removing heat which has been stored within the wire and the former during a quench, the present invention seeks to reduce the amount of heat which is dissipated within the cryostat during a quench. By reducing the amount of heat which is dissipated within the cryogen vessel, the amount of cooling is reduced, and the consumption of cryogen may be reduced. By reducing the amount of heat dissipated within the cryostat, the likelihood of damage to the coils may be reduced.

The present invention accordingly provides methods and apparatus according to the appended claims.

Figure 2:
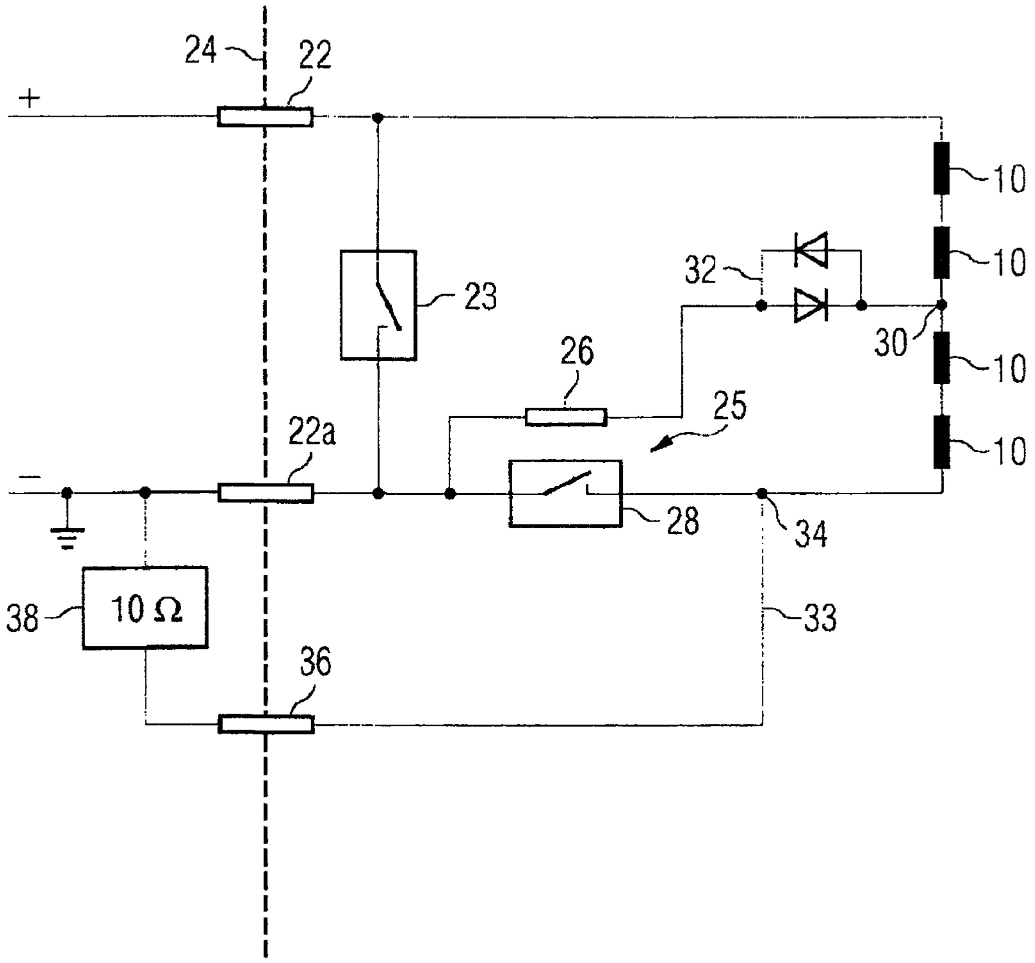

The above, and further, objects, characteristics and advantages of the present invention will become more apparent from the following description of certain embodiments, given by way of examples only, in conjunction with the accompanying drawings, wherein:

FIG. 1 schematically illustrates a radial cross-section of a conventional superconducting magnet; and FIG. 2 shows a circuit diagram of an example embodiment of the present invention.

According to the present invention, arrangements are made for dissipating the energy stored in the magnetic field outside of the cryogen vessel, in response to the onset of a quench. Quenches may occur spontaneously, as mentioned above, for any of a number of possible reasons.

FIG. 2 illustrates a circuit diagram of an embodiment of the present invention. As is conventional, a number of magnet coils 10 are connected in series, and are connected to external current leads 22, 22*a* for connecting the coils to an external power supply. A superconducting switch 23 is connected across the series connection of coils 10. Once a current has been introduced into the coils 10 through the external current leads 22, 22*a* the superconducting switch 23 is closed, and current circulates through the coils 10 and the switch 23, in persistent mode. The current remains substantially unchanged, unless a quench occurs. Dotted line 24 marks the boundary of the cryostat.

According to an aspect of the present invention, a second superconducting switch 25 is added. This second superconducting switch 25 is made up of a resistive heating element 26 associated with a length of superconductive wire 28. The superconductive wire 28 has a particularly resistive matrix instead of copper. This type of wire is known in itself, and may be constructed with copper-nickel. Short lengths of this wire are commonly used in conventional superconducting switches 23 which enable persistent mode operation. However, according to this embodiment of the present invention, a long length of this wire is provided, for example wound on a bobbin or cylinder such that its 'normal' resistance is in the order of 1 kΩ. This length of wire 28 is placed in series between the coils 10 and the negative current lead or 'Earth' 22*a*. Resistive heater 26 is shown connected between a node 30 between certain coils 10 of the magnet and the negative current lead or 'Earth' 22*a*. In alternative embodiments, the resistive heater 26 may be connected between selected nodes between electrically adjacent superconductive coils. A pair of back-to-back diodes 32 is provided, in series between the node 30 and the heater 26 in order to block conduction through resistive heater 26 in response to a ramp voltage being applied to the magnet coils 10.

An electrical connection 33 is provided from a node 34, between the coils 10 and the resistive-matrix superconducting wire 28, to a current lead-though 36 of any suitable type accessible from outside of the cryostat. The current lead-through 36 must be suitably insulated for high voltage and capable of carrying a current of several hundred amps for a few seconds. According to an aspect of the invention, a very high power resistor 38 is connected between the current lead-through 36 and the negative current lead or 'Earth' connection 22*a*.

In operation, any quench occurring in any of the coils 10 will cause a voltage to appear across the heater 26. This voltage will be reduced by the forward voltages of the diodes 32, but will cause the heater 26 to warm the resistive-matrix superconducting wire 28, causing it to quench. This operation is similar to a conventional quench propagation circuit, typically used to induce quench in other coils of a magnet, in response to a quench in one coil. Once the superconducting wire 28 has quenched, its resistance increases. As such a long piece of wire 28 is used, with a particularly resistive matrix material; its resistance may be in the order of 1 kΩ. This resistance is in parallel with external resistor 38, which may have a resistance of 10Ω, for example. The diodes 32 introduce a forward voltage which must be overcome before any current will flow through the heater 26. This forward voltage is small, and will not prevent effective heating of the heater 26 in response to a quench event, but will prevent current from being diverted through the heater 26 during ramping—that is, progressive introduction or removal of current into, or from, the magnet by an external power supply.

Assuming that a current of 101 A flows through the coils 10, 1 A will flow through wire 28, dissipating $I^2R=1^2\times1000=1$ kW of heat. On the other hand, 100 A will flow through external resistor 38, dissipating $I^2R=100^2\times10=100$ kW of heat. Clearly, using the example values stated, the great majority of energy from the magnetic field is dissipated outside of the cryostat. The reduced heat dissipated within the cryostat will consume much less cryogen, than the conventional arrangement in which all heat is dissipated within the cryostat. Some energy will be dissipated within the quenching coil and the corresponding heat will dissipate within the cryogen vessel.

The external resistor 38 must be sized to dissipate a large fraction of the magnet's energy. It must have a resistance such that it dissipates or absorbs this energy in just a few seconds in order to protect the quenching coil from over-heating. Most of the energy dissipated within the quenching coil will still be released as heat into the copper matrix of the superconducting wire and remain within the cryostat. On the other hand, the other coils will not quench, but remain superconductive. They will not be heated by any ohmic heating of their wire. Most of the stored energy from the magnetic field will be dissipated or absorbed externally by the resistor 38. Thus a large fraction of the total magnet energy will be removed from the cryostat and the requirement for subsequent cooling will be significantly reduced.

When the energy stored in the magnetic field has been dissipated, current will cease to flow through heater 26, and wire 28 will cool, and return to its superconductive state. Superconductive switch 23 may be opened, and current introduced into the magnet again by a conventional ramping procedure. When ramping is complete, the superconducting switch 23 may be closed and the magnet returns to its persistent mode of operation.

In this circuit, example electrical values are:

| | | |
|---|---|---|
| Magnet operating current: | 500 | A |
| 'Normal' resistance of switch 25: | 1 | kΩ |
| Resistance of external resistor 38: | 10 | Ω |
| Maximum voltage appearing across external resistor 38: | 5 | kV |
| Initial power dissipation by external resistor 38: | 2.5 | MW |
| Magnet inductance: | 25 | H |
| Initial di/dt: following quench of switch wire 28: | −200 | A/s. |

The present invention accordingly provides a system whereby a considerable fraction of the magnet energy is dissipated outside of the cryogenically cooled part of the magnet system during a quench, in order to reduce the amount of cryogen consumed and reduce the subsequent cool down time.

The present invention has been particularly described with reference to magnets cooled by partial immersion within liquid cryogen, wherein energy dissipation within the cryogen vessel leads to consumption of the liquid cryogen. The present invention may, however, be applied to other types of magnet. For example, some magnets are cooled directly by a cryogenic refrigerator through a thermally conductive link. Although there is no issue of liquid cryogen consumption in such arrangements, heat dissipation within the magnet will lead to increased cryogenic refrigeration requirement, power consumption, and 'down-time', during which the magnet is unavailable for use. In other arrangements, a reduced quantity of cryogen is used. Such arrangements include cooling loop systems, in which a small quantity of cryogen is contained within a small reservoir, and is provided with a thermally conductive tube which extends around the magnet. Cryogen gas absorbs heat from the magnet, and is cooled by a cryogenic refrigerator. The thermal convection currents this sets up ensure effective thermal transfer between the magnet and the cryogen. Such systems tend to have a sealed cryogen system, and additional heat dissipation in such systems may not cause cryogen consumption, but will lead to increased cryogenic refrigeration requirement, power consumption, and 'down-time', during which the magnet is unavailable for use. The present invention may usefully be applied to any of these arrangements, and is not limited to magnets which are cooled by partial immersion in liquid cryogen.

The invention claimed is:

1. An arrangement for a cryogenically cooled superconductive magnet comprising a plurality of superconductive coils connected in series and housed within a cryostat, comprising:

first and second superconducting switches having superconductive current paths connected in series between terminals of the series arrangement of superconductive coils; and a resistor, external to the cryostat, electrically connected in parallel with the superconductive current path of the second superconducting switch, wherein the second superconductive switch is arranged to open in response to an electric current applied to an associated heater element provided in thermal contact with the superconductive current path of the second superconducting switch;

wherein the heater element is connected between a node located between electrically adjacent superconductive coils and another node located between electrically adjacent superconductive coils or between the first and second superconducting switches.

2. The arrangement according to claim 1 wherein the resistor, external to the cryostat, has a lower resistance than the second superconductive switch when open.

3. The arrangement of claim 1, wherein an inverse-parallel pair of diodes is provided in series with the heater element.

4. A method of removing stored energy from a cryogenically cooled superconductive magnet comprising a plurality of superconductive coils connected in series and housed within a cryostat, comprising:

providing first and second superconducting switches having superconductive current paths connected in series between terminals of the series arrangement of superconductive coils and a heater element controlling the second superconducting switch connected between a node located between electrically adjacent superconductive coils and another node located between electrically adjacent superconductive coils or between the first and second superconducting switches;

providing a resistor, external to the cryostat, electrically connected in parallel with the superconductive current path of the second superconducting switch, and in response to the onset of a quench in any of the coils, opening the second superconducting switch, so as to divert current flowing in the coils through the resistor, external to the cryostat, wherein the heater element is subjected to a voltage when quench occurs, but not when the magnet is operating in persistent mode, whereby the heater opens the second superconducting switch by heating in response to the applied voltage and resultant current through the heater element.

* * * * *